United States Patent [19]

Anderson et al.

[11] Patent Number: 4,973,221
[45] Date of Patent: Nov. 27, 1990

[54] GAS TURBINE ENGINE MOTOR ASSEMBLY

[75] Inventors: Bernard J. Anderson, Danvers, Mass.; Melvin Bobo, Cincinnati, Ohio

[73] Assignee: General Electric Company, Lynn, Mass.

[21] Appl. No.: 338,704

[22] Filed: Apr. 17, 1989

[51] Int. Cl.$^5$ ............................................. F01D 5/10
[52] U.S. Cl. ................................. 415/119; 74/574; 188/379; 384/215
[58] Field of Search ............... 415/122.1, 124.1, 119; 74/574; 188/379; 384/215; 60/39.142

[56] References Cited

U.S. PATENT DOCUMENTS

| | | | |
|---|---|---|---|
| 2,538,229 | 1/1951 | Boden | 384/611 |
| 2,595,818 | 5/1952 | Smila | 464/56 |
| 2,603,540 | 7/1952 | Mierley et al. | 384/611 |
| 2,959,918 | 11/1960 | West | 60/39.142 |
| 3,042,391 | 7/1962 | Glaser | 267/1 |
| 3,319,929 | 5/1967 | Lawrence et al. | 74/574 |
| 3,688,560 | 9/1972 | Broman et al. | 60/39.33 |
| 3,750,394 | 8/1973 | Larsen | 60/39.142 |
| 4,044,628 | 8/1977 | Jacks | 74/574 |
| 4,201,426 | 5/1980 | Garten et al. | 384/563 |
| 4,361,213 | 11/1982 | Landis, Jr. et al. | 74/574 |
| 4,401,198 | 8/1983 | Kunczynski | 188/379 |
| 4,809,830 | 3/1989 | Schierling et al. | 192/3.29 |

FOREIGN PATENT DOCUMENTS

| | | | |
|---|---|---|---|
| 1079313 | 6/1980 | Canada | 74/574 |
| 2271452 | 1/1976 | France | |
| 2193290 | 2/1988 | United Kingdom | |

OTHER PUBLICATIONS

European Pat. #49,805 Apr. 1982.
Den Hartog, J. P., *Mechanical Vibrations*, 1956, pp. 210-213.

*Primary Examiner*—John T. Kwon
*Attorney, Agent, or Firm*—Francis L. Conte; Jerome C. Squillaro

[57] ABSTRACT

A gas turbine engine rotor assembly has an inertial damper loosely surrounding a portion of the main rotor shaft. The damper is axially compressed between facing abutment surfaces provided on a nut and bevel gear. The damper has two axially spaced rows of circumferentially spaced slots, with the interrupting web portions of each row being circumferentially staggered with respect to one another. The damper is configured and dimensioned so that the axial force exerted by the damper on the nut and bevel gear, the polar moment of inertia of the damper, and the coefficient of friction between the damper end faces and the abutment surfaces, cooperate to effectively damp the excitation of the fifth-stage blades in response to application of a source of vibrations at a particular frequency to the bevel gear.

20 Claims, 3 Drawing Sheets

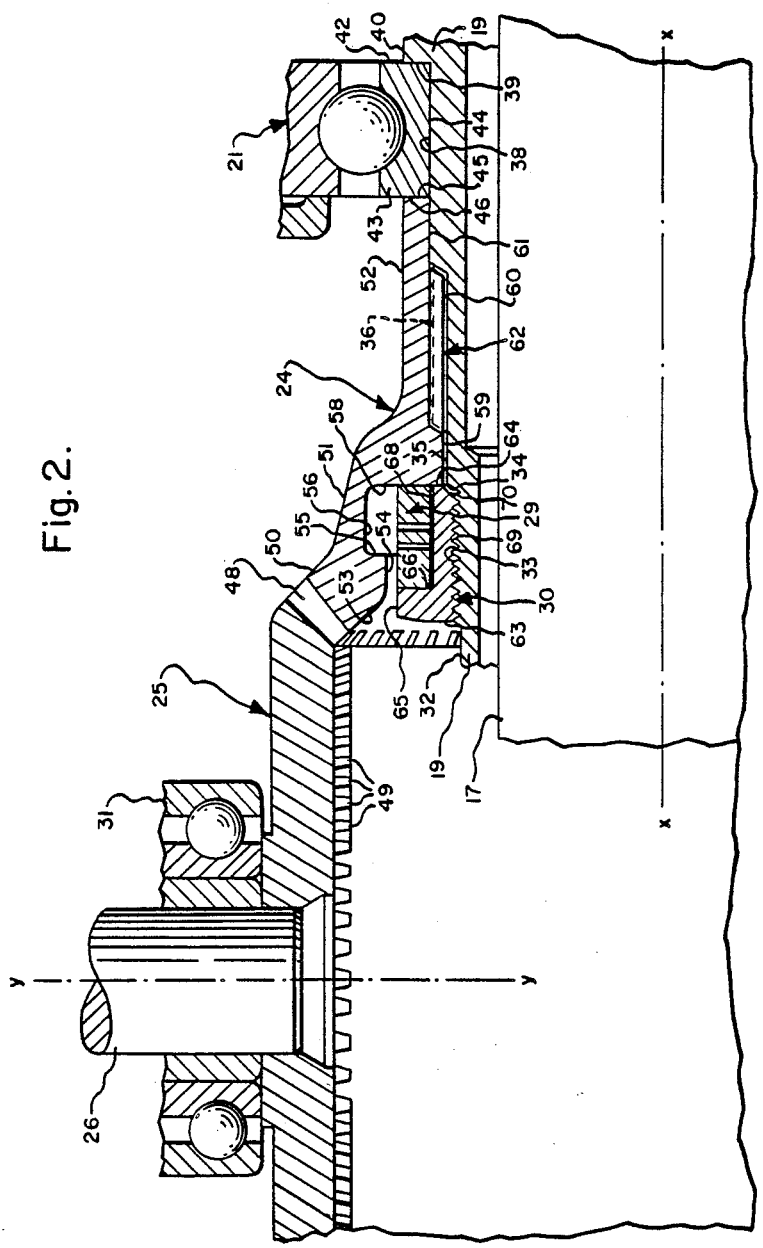

1

GAS TURBINE ENGINE MOTOR ASSEMBLY

BACKGROUND OF THE INVENTION

The present invention relates generally to gas turbine engines, and, more specifically, to an improved gas turbine engine rotor assembly which incorporates an inertial damper for damping selected vibrations transmitted from one portion of the rotor assembly to another portion thereof.

Gas turbine engines have a rotor assembly mounted for rotation within a stator. The rotor assembly typically has a plurality of axially spaced rows of circumferentially spaced blades mounted on a main rotor shaft. In the compressor stage of such rotor assembly, the blades of each row progressively decrease in size in the direction of flow, that is, the blades of each row are smaller than the blades of the immediately adjacent upstream row.

A bevel gear is typically mounted on the main rotor shaft, and is continuously engaged with a cooperative auxiliary bevel gear located at the distal end of an auxiliary shaft. This auxiliary shaft is commonly known as a power-take-off shaft which often has its longitudinal axis arranged so as to be perpendicular, or at least oblique, to the axis of the main shaft. A starter is operatively coupled to the auxiliary shaft. Thus, for example, during engine start-up, the starter causes the auxiliary shaft to rotate up to about 7,000 rpm. Such motion is transmitted through the auxiliary and main shaft bevel gears, to cause the rotor assembly to rotate. After the engine has been started, the powered rotation of the main shaft drives the rotation of the auxiliary shaft. In this mode, the starter is conventionally disconnected and an alternator which is connected to the shaft supplies electrical power to the system of which the engine is a part. Hence, the auxiliary shaft remains mechanically coupled with the main rotor shaft throughout the entire operating speed range of the main shaft which typically extends up to about 46,000 rpm.

In certain engine configurations, it was observed on strain gauges that the fifth-stage compressor blades suffered from excessive vibratory stress levels at or near a resonant frequency during engine start-up. It was noted that the stress due to resonant frequencies of such blades had an apparent relationship to the number of teeth in the rotor assembly bevel gear. More particularly, it was observed that the fifth-stage blades were being excited at "38/rev" (i.e., 38 times the rotor speed), which number coincided with the number of teeth in the rotor assembly bevel gear. From this observation, it was deduced that the vibrational excitation of the fifth-stage blades was attributable to a source of vibrations transmitted from the auxiliary gear to the rotor assembly bevel gear, and through torsional vibration of the rotor shaft to the fifth-stage of the compressor.

SUMMARY OF THE INVENTION

Accordingly, one object of the invention is to provide an improved gas turbine engine rotor assembly.

Another object of the invention is to provide a rotor assembly in which a particular row of blades is not vibrationally excited in response to application of a source of vibrations to a particular portion of the rotor assembly.

Another object is to provide an improved inertial damper for use in a gas turbine engine, which damper is effective to damp the vibrations transmitted from a first portion of the rotor assembly to another portion thereof.

Another object is to provide an improved inertial damper which is effective to damp selected vibrations transmitted from a rotor bevel gear to the fifth-stage row of blades.

Another object is to provide an improved inertial damper for use in a gas turbine engine, which may be easily incorporated into the existing engine configuration and physical constraints, with minimal modification of existing parts and components therein.

An improved gas turbine engine rotor assembly including an improved inertial damper for use therein, is disclosed. The improved damper is adapted to be mounted on the rotor assembly in such a manner as to exert a predetermined force on one abutment surface provided on the rotor assembly, and on another abutment surface provided on the bevel gear. The magnitude of this preload force, the polar moment of inertia of the damper, and the coefficient of friction between the damper and the two abutment surfaces are selected such that vibrational excitation transmitted through the bevel gear will be effectively damped, and will not cause another portion of the rotor assembly (e.g., the blades of the fifth-stage) to become vibrationally excited at or near a resonant frequency, all with an object of obtaining a preferred high-cycle fatigue life of such blades. At the same time, such inertial damper may be readily incorporated into an existing engine design and configuration with a minimum of modification to other structures. Thus, effective damping is provided at minimal cost and effort.

In a preferred embodiment, the improved damper is in the form of a cylindrical tube. The opposite end faces of this tube are adapted to bear against opposed and facing abutment surfaces on the rotor and bevel gear. The tube has at least two axially spaced rows of circumferentially spaced slots. The slots of each row are separated by web-like interruptions, and the interruptions of the various rows are circumferentially staggered with respect to one another. Thus, the damper is made to be axially flexible, and is axially compressed by a predetermined distance to cause the damper to exert the desired preload force on the abutment surfaces.

BRIEF DESCRIPTION OF THE DRAWINGS

The novel features believed characteristic of the invention are set forth in the claims. The invention, in accordance with preferred embodiments, together with further objects and advantages thereof, is more particularly described in the following detailed description, taken in connection with the following drawings, in which:

FIG. 2 is a fragmentary longitudinal sectional view of a portion of the improved engine, showing the bevel and auxiliary gears as being in meshed engagement with one another, and showing the improved damper as being operatively arranged between the nut and the rotor bevel gear.

DETAILED DESCRIPTION

Figure 1:
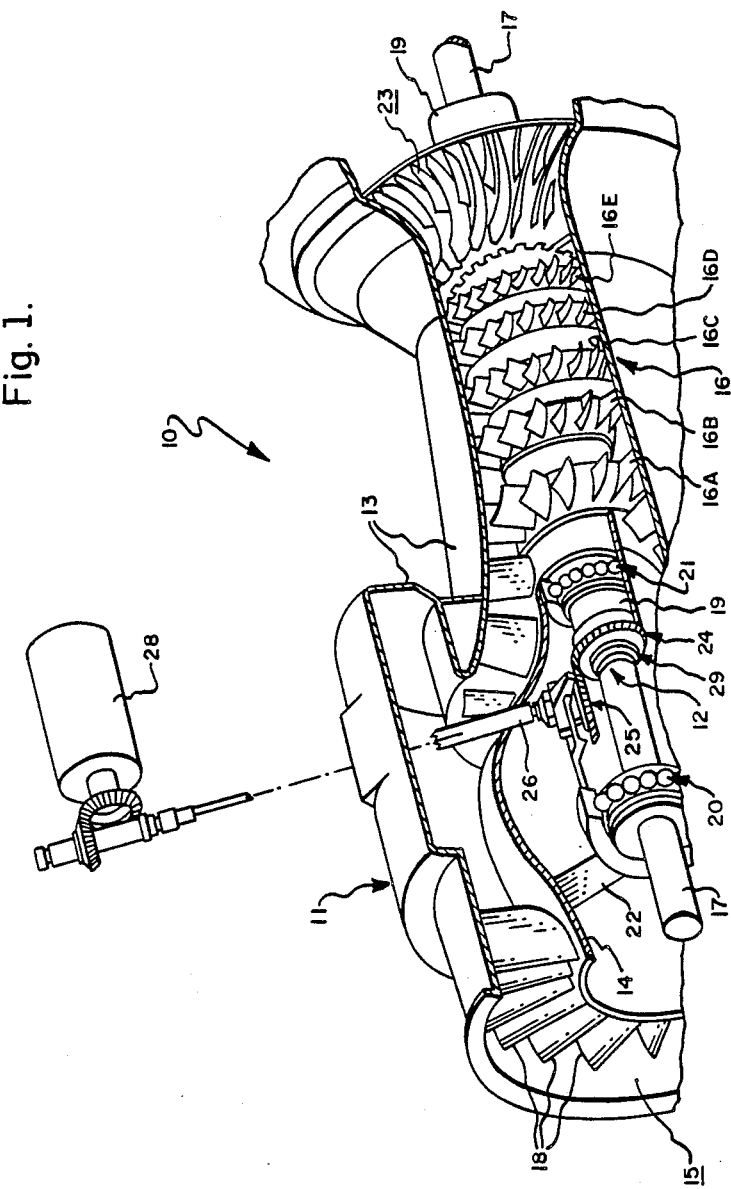
FIG. 1 is perspective schematic view of a forward portion of an improved gas turbine engine, with a portion of the outer casing being broken away to expose the forward portion of the rotor assembly therewithin, this view also showing the starter in exploded aligned relation to the stator casing.

Referring initially to FIG. 1, a portion of an improved gas turbine engine in accordance with a preferred embodiment of the invention, is generally indicated at 10.

Engine 10 is shown as broadly including an elongated stator 11 and a rotor assembly 12 therewithin. The stator includes an outer casing 13 and an inner casing 14, which define therebetween an annular flow passageway which extends rearwardly from a forwardmost inlet 15 to an intermediate compressor portion, generally indicated at 16. A plurality of radially extending circumferentially spaced guide vanes, severally indicated at 18, join the stator inner and outer casings proximate the inlet.

The rotor assembly 12 is shown as having a main shaft 19 suitably journalled on the stator at a forward end by means of an aft bearing 21, with an aft end of the shaft 19 being suitably connected to a high pressure turbine (not shown) which drives the shaft 19. Extending coaxially within the shaft 19 is a power shaft 17 supported at a forward end by a forward bearing 20, with an aft end of the shaft 17 being suitably connected to a low pressure turbine (not shown) which drives the shaft 17 for powering a propeller or helicopter rotor, for example. The outer race of forward bearing 20 is secured to the inner casing by a plurality of circumferentially spaced radially extending struts, one of which is indicated at 22. The outer race of bearing 21 is suitably secured to the rearward marginal end portion of the inner casing.

The compressor portion 16 includes five axially spaced rows of circumferentially spaced rotor blades, which extend outwardly from the main shaft 19 into the annular passageway defined between the disk in which the roots of the blades are mounted, and the outer casing 13. The five rows of blades are severally indicated at 16A, 16B, 16C, 16D and 16E, respectively. Disposed upstream of each blade row is a row of stator vanes, with each vane/blade row combination being referred to as a "stage". The physical size of the blades in each row progressively decreases in the direction of flow through the engine, that is, the first-stage blades 16A are larger than the second-stage blades 16B, which are larger than the third-stage blades 16C, and so on. A centrifugal compressor 23 is also mounted on the main shaft 19 to the rear of the fifth-stage row of blades.

A forwardly facing bevel gear, generally indicated at 24, is mounted on the main rotor shaft, just forwardly of bearing 21. This bevel gear 24 is in continuous meshed engagement with an auxiliary pinion or bevel gear 25 secured to the inward marginal end portion of an auxiliary or power-take-off ("pto") shaft 26. A starter motor 28, shown as being in exploded aligned relation to the engine, is normally mounted on the stator, and is in releasable meshing engagement with auxiliary shaft 26. During engine start-up, starter 28 is operated to selectively rotate the main rotor 19 relative to the stator. However, after the engine has been started, starter 28 is disengaged. Other downstream components of the improved engine, such as the combustor and high- and low-pressure turbines, have been omitted in the interest of clarity.

The portions of the engine just described, are conventional. However, in use, it was observed that the fifth-stage blades 16E exhibited reduced high-cycle fatigue life, due to an apparent resonance thereof at or near a particular rotor speed. More particularly, it was observed that such resonance occurred during start-up at rotor speeds of up to about 7,000 rpm for the rotor shaft 19. Since the speed range of the rotor is from zero to about 46,000 rpm, the rotor passed through a resonance-inducing speed each time the engine was started. Strain gauges were then placed on the fifth-stage blades in an attempt to identify the source of the vibrations which were exciting such blades. In analyzing the data provided by these strain gauges, it was noticed that the blade stresses at or near the critical rotor speed (i.e., at about 7,000 rpm), had a frequency of 38/rev. Since bevel gear 24 had thirty-eight teeth, this suggested that auxiliary gear 25 was transmitting vibrations to the bevel gear, which were causing the fifth-stage blades to vibrate at or near a resonant frequency. Accordingly, the improved damper, generally indicated at 29 in FIG. 1, was designed and configured so as to be operatively mountable on the rotor assembly 12 with a minimum of modifications to the other existing structure of the engine.

Referring now to FIG. 2, the pertinent portion of the engine is shown as again including main rotor shaft 19, bearing 21, bevel gear 24, damper 29, a nut 30, the auxiliary shaft 26, and pinion gear 25. Other structure of the engine which is collateral to an understanding of the improved damper, has been omitted from FIG. 2 in the interest of clarity.

The auxiliary or pto shaft 26 is shown as being rotatable about axis y—y which is perpendicular to a longitudinal centerline rotor axis x—x, and has a lower end portion fixedly mounted to pinion gear 25. Auxiliary shaft 26 is shown as being journalled for rotation in a bearing 31, the outer race of which is adapted to be mounted on the engine stator portion. Pinion 25 has its downwardly and outwardly facing teeth arranged in continuous meshing engagement with the upwardly and leftwardly facing teeth of bevel gear 24.

The illustrated portion of shaft 19 is depicted as being a tubular member elongated along horizontal axis x—x, and having an outer surface which sequentially includes in pertinent part: an outwardly facing horizontal cylindrical surface 32, an externally threaded portion 33, a leftwardly facing annular vertical surface 34, an outwardly facing horizontal cylindrical surface 35, an outwardly facing surface 36 defining spline teeth, and outwardly facing horizontal cylindrical surface 38, a leftwardly facing annular vertical surface 39, and an outwardly facing horizontal cylindrical surface 40 continuing rightwardly therefrom. The other details of shaft 19 are deemed to be collateral to a fundamental understanding of the invention, and have not been illustrated. The rotor shaft is adapted to rotate about axis x—x at angular speeds of from zero to about 46,000 rpm.

Bearing 21 is of conventional design, and is arranged to surround the shaft 19 such that the annular vertical right end face 42 of its inner race 43 is arranged to abut shaft surface 39. The inwardly facing horizontal cylindrical surface 44 of the inner race is arranged in closely spaced facing relation to the right marginal end portion of surface 38.

Bevel gear 24 is shown as being a specially configured member surrounding the shaft 19, and as having its annular vertical right end face 45 abutting the left end face 46 of the bearing inner race. The bevel gear 24 has its upwardly and leftwardly facing teeth, severally indicated at 48, in meshed engagement with the downwardly and rightwardly facing teeth 49 of the auxiliary gear 25. The bevel gear 24 has an outer annular surface, which sequentially includes: an upwardly and rightwardly facing frusto conical surface 50, another upwardly and rightwardly facing frusto conical surface 51, and an outwardly facing horizontal cylindrical surface 52 continuing rightwardly therefrom to join right end face 45. The various portions of the outer surface between surfaces 50,51 and 51,52 are shown as being in smooth continuous transition. The inner surface of the bevel gear 24 sequentially includes: an inwardly and leftwardly facing frusto conical surface 53 extending rightwardly and inwardly from teeth 48, an inwardly facing horizontal cylindrical surface 54, a rightwardly facing annular vertical surface 55, an inwardly facing horizontal cylindrical surface 56, a leftwardly facing annular vertical surface 58, an inwardly facing horizontal cylindrical surface 59, and inwardly facing surface 60 defining spline teeth, and an inwardly facing horizontal cylindrical surface 61 continuing rightwardly therefrom to join right end face 42. The bevel gear is shown as having a splined connection, indicated at 62, with shaft 19, which is defined by the interdigitated spline teeth of surfaces 36 and 60. Thus, the bevel gear is slipped over the shaft 19, and is moved rightwardly relative thereto such that bevel gear right end face 45 abuts bearing inner race left end face 46.

Nut 30 is shown as being a specially configured annular member having an annular vertical left end face 63, and annular vertical right end face 64, and a stepped outer surface which sequentially includes a polygonal surface 65, a rightwardly facing annular vertical abutment surface 66, and an outwardly facing horizontal cylindrical surface 68 continuing rightwardly therefrom to join right end face 64. The inner surface of the nut is shown as having an internally threaded portion 69 extending rightwardly from left end face 63, and having a rightwardly and inwardly facing frusto conical surface 70 continuing therefrom to join right end face 64. The nut is threaded on to shaft threads 33 on the shaft 19, and is selectively tightened until nut right end face 64 abuts the inner marginal end portion of bevel gear abutment surface 58.

Figures 3, 4, 5:
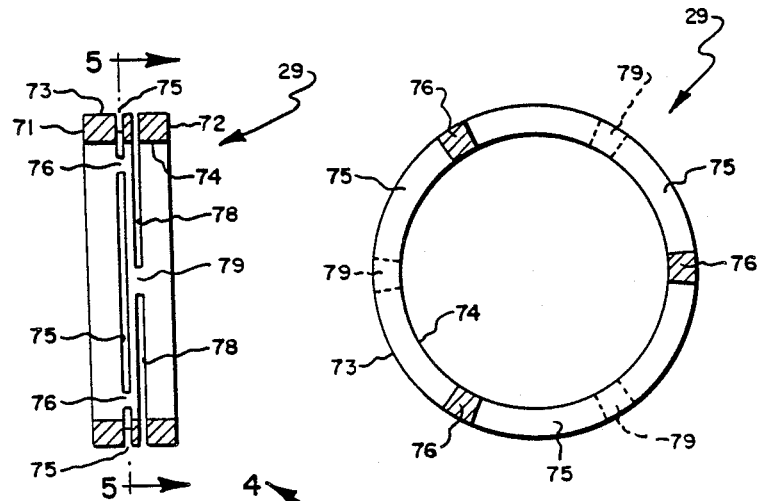
FIG. 3 is a perspective detail view of the improved damper.
FIG. 4 is a longitudinal vertical sectional view of the improved damper, taken generally on line 4—4 of FIG. 3.
FIG. 5 is a transverse vertical sectional view of the improved damper, taken generally on line 5—5 of FIG. 4.

Referring now to FIGS. 2-5, damper 29 is shown as being a horizontally elongated cylindrical tube compressively sandwiched between the bevel gear 24 and the nut 30. As best shown in FIG. 4, the damper has an annular vertical left end face 71, an annular vertical right end face 72, an horizontal cylindrical outer surface 73, and a horizontal cylindrical inner surface 74. The inner margin of the damper left end face 71 is arranged to engage nut abutment surface 66. The damper right end face 72 is arranged to engage bevel gear abutment surface 58. The damper inner surface 74 is spaced from the nut surface 68 to create up to about 2 mils (0.002 inches) of maximum diametral clearance to prevent undesired unbalance due to offset of the damper 29. A minimum diametral clearance of about ½ mil (0.0005 inches) is preferred to prevent binding of the damper 29 and allow unrestricted circumferential movement.

As best shown in FIGS. 3-5, the preferred form of the damper 29 is provided with two axially spaced rows of circumferentially spaced through slots, there being three of such slots in each row. The two rows are preferably provided in the central portion of the damper, with the slots of the left row being arranged to the left of the axial midpoint of the damper, and the slots of the right row being arranged to the right of such midpoint. Thus, in the preferred embodiment, the left and right rows of slots are centered about such midpoint. The slots of the left row are severally indicated at 75, and the webs or interruption therebetween are severally indicated at 76. Similarly, the slots of the right row are severally indicated at 78, and the webs or interruptions therebetween are severally indicated at 79. The slots of each row severally occupy arc distances of about 110°, with the interrupting web portions occupying arc distances of about 10°. The slots and webs of the two rows are equally dimensioned and proportioned, but are circumferentially staggered with respect to one another, as shown in FIG. 5. If desired, such slots may be made by conventional electro discharge machining. The purpose of these rows of slots is to cause the damper to be flexible to compression in an axial direction. Thus, the damper has a relatively low spring rate in the axial direction.

The damper is mounted on the rotor assembly as shown in FIG. 2, with its right end face 72 engaging bevel gear abutment surface 58, and with its left end face 71 abutting nut abutment surface 66. The damper is formed to have a particular uncompressed axial length, and the nut is configured so as to have a predetermined shorter axial dimension between its right end face 64 and its abutment surface 66. Hence, when the nut is threaded on to the rotor such that the nut end face tightly engages bevel gear surface 58, the damper will be axially compressed by a known distance (i.e., the difference between the undeflected free axial length of the damper and the axial distance between nut abutment surface 66 and nut end face 64). The spring rate of the damper, coupled with its axial compression by a known amount, causes the left and right end faces of the damper to exert a known preload force on each of the nut and bevel gear abutment surfaces 66,58, respectively. In a specific embodiment, the damper is configured so that such preload force is about ten pounds. The preload force is selected to provide maximum damping for each application.

Furthermore, the damper 29 is configured and dimensioned so that the magnitude of such preload force, the coefficient of friction between the damper end faces and the facing abutment surfaces, and the polar moment of inertia of the damper, are such that both end faces 71 and 72 of the damper 29 will "skid" or slip relative to the abutment surfaces 58 and 66 when the rotor is torsionally excited by the bevel gear 24 during start-up, thereby to damp the vibrations transmitted from the bevel gear through the shaft or other vibrationally-conductive structure to the excitable rotor portion, such as the blades of the fifth-row.

More specifically, the improved rotor assembly 12 in accordance with the exemplary, preferred embodiment of the invention includes the damper 29, which dissipates by friction vibrational excitation energy and predeterminedly includes sufficient axial flexibility for making the damper 29 practical without compromising structural integrity when being operated at high rotational speed up to about 46,000 rpm.

Damping is accomplished by selecting the polar moment of inertia of the damper 29 and the frictional force between the damper 29 and the abutment surfaces 58 and 66 so as to provide for deliberate relative torsional slippage therebetween when the bevel gear 24 is vibrationally excited at a predetermined frequency, such as that occurring due to the 38/rev excitation of the bevel gear 24.

At such a condition of excitation, the bevel gear 24, shaft 19 and nut 30 will torsionally vibrate or oscillate, and the damper 29 will tend to resist that vibration due to its polar moment of inertia. If the frictional forces between the damper 29 and the abutment surfaces 58 and 66 are relatively low, the damper 29 will tend to remain at the nominal speed of rotation of the shaft 19 and not follow the vibrational motion of the bevel gear 24. If the frictional forces are relatively high, the damper 29 will follow or vibrate with the bevel gear 24, and effective damping will not occur. If a moderate amount of friction is provided, that friction will dissipate torsional vibration energy due to the torsional slippage between the damper 29 and the abutment surfaces 58 and 66.

Accordingly, the polar moment of inertia and the axial preload of the damper 29 are selected in a trade-off to insure that the resistance to torsion forces due to the polar moment of inertia become greater than the frictional forces due to the axial preload of the damper 29 at the predetermined condition causing the torsional excitation. At such a condition, the contact between the damper 29 and the abutment surfaces 58 and 66 is such as to allow torsional slippage which frictionally dissipates excitational energy.

In a preferred embodiment, the polar moment of inertia had a value of $3.9 \times (10)^{-4}$ inch-pounds-second$^2$ and the axial preload force was about 10 pounds.

An accurate amount of axial preload is required on the damper 29 to ensure slippage of the damper 29 at a predetermined level of torsional vibration. Although the damper 29 could be imperforate, it would also be relatively axially stiff and the dimensional tolerances of the damper 29 relative to the abutment surfaces 58 and 66 required to insure a predetermined axial preload would be substantially small and not practical. The axial preload could also be generated by use of an additional spring biasing means, but would therefore be relatively more complex and would have to be additionally effective at the relatively high rotational speeds.

In accordance with the preferred embodiment, the slots 75 and 78 are provided to create a member (i.e., the damper 29) which not only provides for frictional damping, but also inherently provides relative axial flexibility due to the slots 75 and 78. The axial flexibility allows for sufficient axial compression of the damper 29 between the abutment surfaces to insure an accurate and relatively low amount of axial preload force. For example, the axial preload force of 10 pounds in the preferred embodiment was obtained by axially compressing the damper 29 between the abutment surfaces 58 and 66 a distance of 10 mils (i.e., 0.010 inches).

Since the slots 75 and 78 are oriented in the circumferential direction, undesirable stress in the damper is not generated under the high centrifugal loads occurring at the high rotational speeds of up to about 46,000 rpm. And, the damper 29 retains adequate structural integrity and maintains a constant preload at all speeds.

The improved engine rotor assembly and damper are capable of many changes and modifications. For example, the damper may be provided with more than two axially spaced rows of circumferentially spaced slots, if desired, and these may not necessarily be arranged symmetrically with respect to the axial midpoint of the damper. The slots of each row may be "saw cut" or otherwise formed, as desired. Various spacers (not shown) might be provided between the bevel gear 24 and the bearing inner race 43, and/or between inner race 43 and the shaft 19. The engaged surfaces of the damper, nut and bevel gear (i.e., surfaces 66,71 and surfaces 72,58) may be suitably finished (i.e., polished, roughened, etc.) so as to determine a selected coefficient of friction therebetween.

While there have been described herein what are considered to be preferred embodiments of the present invention, other modifications of the invention shall be apparent to those skilled in the art from the teachings herein, and it is, therefore, desired to secure in the appended claims all such modifications as fall within the true spirit and scope of the invention.

Accordingly, what is desired to be secured by Letters Patent of the United States is the invention as defined and differentiated by the following claims.

We claim:

1. A gas turbine engine having a rotor assembly mounted for rotation within a stator, and wherein a first portion of said rotor assembly is vibrationally excitable by application of a source of vibrations at a particular frequency to a second portion of said rotor assembly, the improvement which comprises:

an inertial damper having first and second surfaces and mounted on said rotor assembly in such a manner as to axially compress said damper between said first and second surfaces to exert a predetermined force on said rotor assembly second portion by said first and second surfaces, the polar moment of inertia of said damper and the magnitude of said predetermined force being cooperatively selected so as to effectively damp by friction at said first and second surfaces the torsional vibrations transmitted to said rotor first portion from said rotor second portion at said frequency.

2. A gas turbine engine as set forth in claim 1 wherein said rotor assembly has a plurality of rows of circumferentially spaced blades, and wherein said rotor first portion is one row of said blades.

3. A gas turbine engine as set forth in claim 2 wherein said rotor assembly has at least five of said rows, wherein the sizes of the blades in each row progressively decrease in a direction away from a first of said rows, and wherein said rotor assembly first portion is the fifth of said rows.

4. A gas turbine engine as set forth in claim 1 wherein said rotor assembly second portion is a bevel gear.

5. A gas turbine engine as set forth in claim 4 wherein said engine has an auxiliary shaft elongated along an axis which is oblique to the axis of rotation of said rotor assembly, and wherein said bevel gear is rotationally coupled to said auxiliary shaft.

6. A gas turbine engine as set forth in claim 4 wherein said bevel gear has an abutment surface, and wherein said damper first surface is arranged to frictionally engage said bevel gear abutment surface in such a manner as to provide releasable contact therebetween.

7. A gas turbine engine as set forth in claim 6 and further comprising a nut threadedly mounted on said rotor assembly, said nut having an abutment surface arranged to face said bevel gear abutment surface, and wherein said damper second surface is arranged to frictionally engage said nut abutment surface in such a manner as to provide releasable contact therebetween.

8. A gas turbine engine as set forth in claim 7 wherein said damper is a cylindrical tube compressively held between said nut and bevel gear abutment surfaces.

9. A gas turbine engine as set forth in claim 8 wherein said tube is axially flexible and has an undeformed axial length, and wherein said nut has an end surface arranged to engage a portion of said bevel gear to cause said bevel gear and nut abutment surfaces to be spaced from one another by a predetermined distance and to cause said damper to exert said predetermined force on said nut and bevel gear abutment surfaces.

10. A gas turbine engine as set forth in claim 9 wherein said tube has at least two axially spaced rows of circumferentially spaced slots.

11. A gas turbine engine as set forth in claim 10 wherein the slots of each row are circumferentially staggered with respect to the slots of each adjacent row.

12. An inertial damper adapted to be mounted on the rotor assembly of a gas turbine engine to damp the vibrational excitation of a first portion thereof attributable to application of a source of vibrations at a particular frequency to a second portion thereof, said rotor assembly having a first abutment surface arranged on said rotor assembly second portion and having a second abutment surface arranged in spaced facing relation to said first abutment surface, said damper comprising:
a cylindrical tube configured so as to be axially flexible and adapted to be axially compressed between said first and second abutment surfaces, said tube being so configured and dimensioned that the polar moment of inertia of said tube and the force adapted to be exerted by said tube on each of said abutment surfaces will effectively frictionally damp the vibrations of said rotor assembly first portion attributable to the source of vibrations at said frequency applied to said rotor assembly second portion.

13. An inertial damper as set forth in claim 12 wherein said tube has a plurality of rows of circumferentially spaced slots.

14. An inertial damper as set forth in claim 13 wherein said tube has two of said rows.

15. An inertial damper as set forth in claim 14 wherein one of said rows is located on one side of the axial midpoint of said tube, and the other of said rows is located on the other side of said axial midpoint.

16. An inertial damper as set forth in claim 14 wherein the interruptions between the slots of one of said rows are circumferentially staggered with respect to the interruptions between the slots of the other of said rows.

17. A gas turbine engine rotor assembly, comprising:
a shaft including a bevel gear and a plurality of rows of circumferentially spaced blades, said bevel gear having a first abutment surface, the blades of one of said rows being vibrationally excitable by application of a source of vibrations at a particular frequency to said bevel gear;
a nut mounted on said shaft and having a second abutment surface arranged in spaced relation to said first abutment surface; and
an inertial damper having one end face arranged to frictionally engage said first abutment surface and having a second end face arranged to frictionally engage said second abutment surface, said damper having an axial spring rate and being compressively deflected between said abutment surfaces such that said damper will exert a predetermined force on each of said abutment surfaces, said damper being so configured and dimensioned that the polar moment of inertia of said damper, the coefficients of friction between said end faces and said abutment surfaces and the magnitude of said predetermined force will effectively damp the vibrations transmitted through said bevel gear from said source of vibrations at said particular frequency to said bevel gear.

18. A gas turbine engine rotor assembly as set forth in claim 17 wherein said damper is a cylindrical tube having its inwardly-facing cylindrical surface spaced from a proximate portion of said rotor assembly.

19. A gas turbine engine rotor assembly as set forth in claim 18 wherein said tube has at least two axially spaced rows of circumferentially spaced slots.

20. A gas turbine engine rotor assembly as set forth in claim 19 wherein the slots of each row are circumferentially staggered with respect to the slots of an adjacent row.

* * * * *

UNITED STATES PATENT AND TRADEMARK OFFICE
CERTIFICATE OF CORRECTION

PATENT NO. : 4,973,221

DATED : November 27, 1990

INVENTOR(S) : Bernard J. Anderson et al

It is certified that error appears in the above-identified patent and that said Letters Patent is hereby corrected as shown below:

In the title on both the cover sheet and in column 1 of the first page of the text, change "Motor" to --Rotor--.

Signed and Sealed this

Thirty-first Day of March, 1992

Attest:

HARRY F. MANBECK, JR.

*Attesting Officer*  *Commissioner of Patents and Trademarks*